Nov. 5, 1957 W. SIX ET AL 2,812,384
AUTOMATIC TELEPHONE SYSTEM
Filed Nov. 5, 1953
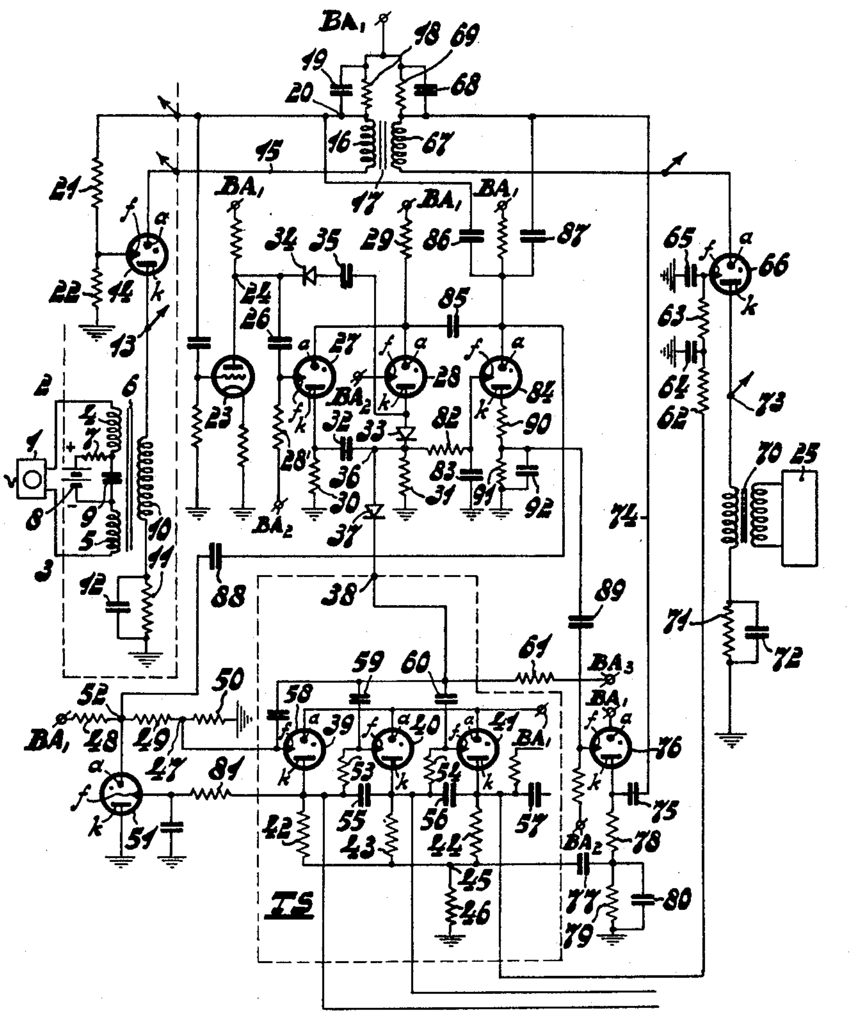
INVENTORS
WILLEM SIX
JACOBUS DOMBURG
BY [signature]
AGENT 2,812,384
Patented Nov. 5, 1957

2,812,384

AUTOMATIC TELEPHONE SYSTEM

Willem Six and Jacobus Domburg, Eindhoven, Netherlands, assignors, by mesne assignments to North American Philips Company, Inc., New York, N. Y., a corporation of Delaware Application November 5, 1953, Serial No. 390,310

Claims priority, application Netherlands November 20, 1952

3 Claims. (Cl. 179—16)

Electronic automatic telephone systems have been proposed, in which a sub-station is connected via a junction line to a central office where it is connected, with the interposition of a source of voltage supply, to a primary winding of a transformer, a secondary winding of which, upon a call from the substation, is adapted to be connected through further connecting means to a line wire of a connecting circuit. In the prior system, said connecting means comprises discharge paths of gas discharge tubes adapted to pass on dial signals and voice currents. The internal resistance of said discharge paths is comparatively high and the transformer has for its purpose to step up the low resistance of the connecting line in order to match the line current path of the subscriber better to the connecting means in the central office. This expedient has a limitation in that the transformer is unable to pass direct current variations and hence does not permit signalisation in the usual manner by means of direct currents. In this case, the sub-station comprises a dial which permits the connecting line to be interrupted a number of times dependent upon the desired digit, thus producing in the secondary transformer winding pulses of opposite polarity on closing and opening the line loop. The pulses produced at the beginning of each dial pulse have the same polarity as the clearing pulse produced on termination of the call by replacing the receiver. In order to be able to distinguish dial pulses from such a clearing pulse, an amplitude difference between these pulses of different nature is made in the prior system. To this end, the dial in the sub-station is shunted by an impedance so that the dial pulses are weaker than the clearing pulses, the receiving means in the central station being adapted to respond differently upon the reception of strong pulses and weak pulses. In practice, however, such a marginal difference between pulses of different nature is liable to cause trouble, for example due to different resistances of the connecting lines.

The system according to the present invention mitigates this disadvantage. In this instance, the receiving means comprise a trigger circuit which is adapted to occupy an electrically stable rest state and an electrically stable working state and is controllable by pulses of different polarity produced on opening and closing the path of the line current, in such a manner that the trigger circuit passes over to the working state on opening the line loop and resumes the rest state on closing the line loop. A starting point of the trigger circuit is associated through an integrating network with a control electrode of an auxiliary tube which is normally cut off. In the rest state of the trigger circuit, the potential of said starting point is comparatively low and in the working state it is higher than is necessary for making the auxiliary tube conductive, the time constant of the integrating network being such that the potential of the control electrode of the auxiliary tube during a series of dial pulses remains below the value at which the auxiliary tube becomes conductive. When the auxiliary tube becomes conductive this is the criterion that a clearing pulse has been received, that is to say that the line loop has been interrupted for a comparatively long time. When the auxiliary tube becomes conductive and connection is again interrupted.

In order that the invention may be readily carried into effect, it will now be described in detail with reference to the accompanying drawing, in which one embodiment thereof is shown by way of example and in which a subscriber's station 1 is connected over line wires 2 and 3 to the ends of two equal windings 4 and 5 of a transformer 6 in a central station. The other ends of the windings 4 and 6 are connected, in series with a resistor 7, to the terminals of a source of voltage supply 8 and coupled together through a capacitor 9 for voice frequency currents. One end of a secondary winding 10 of the transformer 6 is earthed by way of the parallel-connection of resistor 11 and capacitor 12, whereas the other end of the winding 10 is connected via a multiple point 13 to the cathodes *k* of a number of gas discharge tubes 14, of which only one is shown in the drawing, and over which a connection with a connecting circuit can be established in the case of a call initiated by the subscriber. The anodes *a* of the gas discharge tubes 14 are to this end connected to line wires 15 of different connecting circuits. For the sake of simplicity, only one connecting circuit is shown in the drawing. In each connecting circuit, the line wire 15 is connected by way of the primary 16 of transformer 17 and the parallel-arrangement of resistor 18 and capacitor 19 to a voltage source $BA_1$ (not shown) whose voltage is lower than the breakdown voltage between the anodes and the cathodes of the gas discharge tubes, but higher than the operating voltage between said electrodes. The gas discharge tubes are normally cut off. A trigger electrode *f* of the tubes is connected to a tapping on a voltage divider 21, 22 connected between point 20 and earth, with the result that the potential of the trigger electrode *f*, if none of the tubes 14 is conductive, is slightly lower than the ignition voltage between the trigger electrode *f* and the cathode *k* of these tubes.

When the subscriber lifts his receiver for making a call, a circuit is closed from the positive terminal of the supply 8 via the resistor 7, winding 4, line wire 2, station 1, line wire 3 and winding 5 to the negative terminal of the supply. Owing to the differentiating action of transformer 6, a negative pulse of short duration is produced at the multiple point 13 to the effect of permitting ignition of all the tubes 14 connected to a free connecting circuit. As soon as one of these tubes ignites, a voltage drop occurs via the resistor 11, with the result that the potential of the cathodes of the tubes 14 rises sufficiently to prevent the remaining tubes from becoming conductive. Any tube connected to a busy connecting circuit cannot become conductive, since the potential of its trigger electrode *f* has a comparatively low value due to the voltage drop occurring via the resistor 18 in such a connecting circuit.

Upon ignition of a tube 14, the voltage at point 20 drops in the connecting circuit concerned, with the result that the vacuum amplifier tube 23 transmits a positive pulse to point 24, whence it is transmitted via capacitor 26 to the trigger electrode *f* of a gas-filled tube 27. On the trigger electrode *f* is impressed, via resistor 28', a bias $BA_2$ slightly lower than the ignition voltage, so that the tube is ignited by said calling pulse. The tubes 27 and 28 together form a trigger circuit, the anodes *a* of these tubes being supplied in common from the supply $BA_1$ via resistor 29. The cathode circuits comprise resistors 30 and 31, and the cathodes *k* are capacitatively associated via capacitor 32 in series with a rectifier 33 whose purpose will be set out hereinafter, the arrangement being such that if either of the tubes is ignited the other is cut off automatically.

It will be assumed that the subscriber subsequently chooses the digit 3 of his dial. On opening the line loop a positive pulse is produced at the multiple point 13, which pulse is transmitted as a negative pulse to point 24 by the gas discharge tube 14 via the winding 16 and the amplifier tube 23, whence it is passed on via rectifier 34 and capacitor 35 to the cathode *k* of tube 28. The rectifier 33 prevents this pulse from being damped by the resistor 31. The trigger electrode *f* of tube 28 has a voltage $BA_2$ which is slightly lower than the ignition voltage so that the tube 28 is ignited by the negative pulse produced at point 24 on opening the line loop, the tube 27 then being cut off. On closing the line loop at the end of each dial pulse a negative pulse is produced at point 13 and a positive pulse at 24, whereupon the tube 27 ignites again and the tube 28 is cut off.

The point 36 in the cathode circuit of tube 28 is connected via rectifier 37 to the control point 38 of an electronic counting circuit arrangement TS. This counting circuit is of a type known per se and includes ten gas-filled tubes of which only tubes 39, 40 and 41 are shown in the drawing. The anodes *a* are connected to the supply $BA_1$, the cathodes being connected by way of separate resistors 42, 43, 44 to a common point 45 which is earthed via a resistor 46. The trigger electrode *f* of tube 39 is connected to a tapping 47 on the voltage divider 48, 49, 50 connected between the supply $BA_1$ and earth. The trigger electrode *f* of the gas-filled discharge tube 39 consequently has the potential slightly lower than the ignition voltage, as long as the tube 51, whose anode *a* is connected to point 52 on the said voltage divider, is blocked. The trigger electrodes *f* of the remaining tubes of the counting circuit TS are each connected, via resistors 53, 54 and so on, to the cathode of the preceding tube. The cathodes *k* are further associated with each other through capacitors 55, 56, 57 and so on, whilst the trigger electrodes of the several tubes are associated via capacitors 58, 59, 60 with the control point 38 of the counting circuit. The counting circuit registers the number of positive pulses produced at the control point 38. The first positive pulse ignites the tube 39 whose trigger electrode then has the highest potential of all the trigger electrodes. Owing to the voltage drop across the resistors 42 and 46, the potential of the trigger electrode *f* of the second tube 40 rises to a value exceeding that of the remaining trigger electrodes, so that the second pulse ignites the tube 40. The capacitor 55 then transmits a strong positive pulse from the cathode of tube 40 to the cathode of tube 39 with the result that this tube is cut off. At the same time the potential of the trigger electrode of tube 41 rises to a high value so that the third pulse ignites the tube 41 and the tube 40 is cut off, and so on.

For reasons stated hereinafter, the circuit arrangement is such that the counting circuit registers a number of pulses which occur on closing the line loop at the ends of the dial pulses. The control point 38 receives via resistor 61 a bias $BA_3$ which is higher than the potential set up at the cathodes of the tubes 27 and 28 in the conductive condition. Hence, the rectifier 37 is blocked both in the conductive and in the non-conductive condition. As has already been stated, the tube 27 ignites in the case of a call, but the rectifier 37 then remains blocked, since the potential of point 36 cannot exceed the voltage $BA_3$. The tube 28 ignites at the beginning of the first dial pulse. In this case, also, the potential of point 36 remains below the voltage $BA_3$. At the end of the dial pulse, however, the rectifier 37 does become conductive, since the voltage drop via resistor 30, inclusive of the voltage occurring via capacitor 32 owing to the tube 28 being conductive, exceeds the voltage $BA_3$. At the end of each dial pulse, i. e. when the line loop is again closed, a positive pulse consequently occurs at 38, which pulse is registered by the counting circuit TS in the aforesaid manner.

The cathodes *k* of the tubes 39, 40, 41 and so on are associated by way of retarding networks 62, 63, 64, 65 to trigger electrodes *f* of gas-filled tubes 66. For the sake of simplicity, only one of the retarding networks and only one of said tubes is shown in the drawing. As has been stated, the first and the second dial pulses cause the tubes 39 and 40 to ignite. The voltage of the cathodes of these tubes then increases, but the voltage of the trigger electrode connected to said cathodes via retarding networks (not shown), cannot increase to such a point as to ignite the associated tubes, since the tubes 39 and 40 remain conductive for a short time only. Since the third dial pulse is not followed by a fourth pulse, the tube 66, whose trigger electrode is associated with the cathode of tube 41, does ignite. The tubes 66 serve to establish a connection between the connecting circuit and the following apparatus which are diagrammatically represented and designated 25 and may, for example, comprise the following selection stages or outgoing lines. The anodes *a* of the tubes 66 are connected by way of the secondary 67 of transformer 17 and the resistor 69 shunted by the capacitor 68 to the supply $BA_1$, whereas the cathodes *k* are each earthed by way of a winding of a transformer 70 and the parallel-arrangement of a resistor 71 and a capacitor 72. If the apparatus 25 is already busy, the tube 66 cannot become conductive, since in this event the multiple point 73 has a higher potential. Hence, ignition of tube 66 is indicative of the apparatus 25 being free. The counting circuit TS should resume its rest condition upon ignition of tube 66, since otherwise the capacitors 64 and 65 will retain a comparatively high voltage which might involve re-ignition of tube 66 at the end of the call, when all gas-discharge tubes are required to be cut off.

When the voltage of the anode of tube 66 drops due to this tube becoming conductive, the wire 74 transmits via capacitor 75 a negative pulse to the cathode *k* of tube 76, with the result that this tube ignites and the potential of the cathode increases which, in turn, results in that the capacitor 77 transmits a positive pulse to the cathodes of all the tubes of the counting circuit TS to the effect of cutting off tube 41. The cathode circuit of the tube 76 comprises such an impedance 78, 79, 80 as to cause said tube to be cut off automatically.

A connection has now been established between the subscriber's station 1 and the apparatus 25 via transformer 6, gas-discharge tube 14, transformer 17, gas-discharge tube 66 and transformer 70, another subscriber then being able to select a fresh number. The tube 51 serves to prevent the counting circuit TS from responding again to a next following series of dial pulses. The trigger electrode *f* of tube 51 is connected by way of a resistor 81 to the cathode of tube 39. As has been stated, the tube 39 is ignited by the first dial pulse, the voltage of the cathode increasing to such a point as to ignite also tube 51, due to which the voltage of the trigger electrode *f* of tube 39 attains a comparatively low value. The tube 51 is not cut off when tube 76 becomes conductive. At the beginning of each dial pulse of a next following series of pulses the tube 28 and at the end of each impulse the tube 27 will ignite, it is true, and a positive pulse will then be passed to the control point 38 of the counting circuit TS, but the voltage across the trigger electrodes of the counting circuit is now such that none of the tubes can become conductive.

When the subscriber replaces his receiver at the end of the call or, as the case may be, prior to establishing a voice connection, a positive clearing pulse occurs at the multiple point 13 and a negative pulse occurs at point 24, just as is the case at the beginning of a dial pulse, with the result that the tube 28 ignites in the aforesaid manner. In this instance, however, the positive pulse at point 13 is not followed by a negative pulse, so that the tube 28 remains conductive. The point 36 in the cathode circuit of tube 28 is associated to the trigger electrode *f* of the gas-discharge tube 84 by way of an integrating network comprising a resistor 82 and a capacitor 83. In the conductive condition of tube 28, the potential of point 36 is higher than the ignition voltage of tube 84. During a series of dial pulses the tube 28 constantly remains conductive for a short time only, the voltage of the trigger electrode *f* of tube 84 then being unable to attain such a value as to ignite tube 84. Upon the reception of a clearing pulse, however, the tube 28 remains conductive and after some time the voltage of the trigger electrode of tube 84 rises sufficiently to make tube 84 conductive. The capacitors 85, 86, 87 and 88 then pass a strong negative pulse to the anode circuits of the tubes 14, 66, 27, 28 and 51 with the result that these tubes are cut off. At the same time the capacitor 89 supplies a positive pulse to the trigger electrode *f* of tube 76 with the result that this tube ignites and causes the counting circuit to resume its rest condition, provided this has not been brought about already by ignition of tube 66. The cathode circuit of tube 84 comprises such an impedance 90, 91, 92 as to block the tube 84 automatically. As has been stated, some time elapses before ignition of tube 84 upon reception of a clearing pulse, owing to the presence of the integrating network 82, 83. If the circuit-arrangement were such that the counting circuit would count the number of pulses produced on opening the line loop, the counting circuit would consequently also respond to the clearing pulse and an undesired connection could be established for a short time between the clearing pulse and ignition of tube 84.

What is claimed is:

1. An automatic telephone system comprising a central office, an input circuit comprising a sub-station and means connecting said sub-station to said central office, and an output circuit connected to said central office, said input circuit including means for producing a series of dial pulses having alternately opposite polarities and means for producing a clearing pulse having a fixed given polarity, said central office comprising a normally open electronic connecting means for connecting said input circuit to said output circuit in response to said dial pulses and further including an auxiliary tube for returning said connecting means to its normally open position in response to said clearing pulse, said auxiliary tube having a control electrode, and an integrating circuit connected between said control electrode and said input circuit whereby said auxiliary tube is responsive to said clearing pulse and is unresponsive to said dial pulses.

2. An automatic telephone system comprising a central office, a connecting circuit, and a sub-station, a transformer in said central office having primary and secondary windings, a source of voltage connected in series combination with said primary winding, a junction line electrically connecting said sub-station across said series combination, dial means at said sub-station for opening and closing the circuit of said junction line a number of times in rhythmical sequence to produce dial pulses having alternately opposite polarities at said secondary, means at said sub-station for opening the circuit of said junction line at the end of a call to produce a clearing pulse of a fixed given polarity at said secondary, said central office comprising a normally open electronic connecting means for selectively connecting said secondary winding to said connecting circuit, a pulse counting circuit connected to actuate said connecting means after receiving a predetermined number of pulses, a trigger circuit having a starting point connected to receive said pulses from said secondary and having an output terminal connected to feed pulses to said counting circuit, an auxiliary tube having a control electrode and connected to return said connecting means to its normally open position in response to said clearing pulse, and an integrating circuit connected between said control electrode and said starting point whereby said auxiliary tube is responsive to said clearing pulse and is unresponsive to said dial pulses.

3. The automatic telephone system of claim 2, in which said trigger circuit comprises a pair of gas-filled tubes each having an output electrode and arranged in a circuit so that said last-named tubes are normally blocked and associated with each other in such manner that if one becomes conductive the other is cut off, said gas-filled tubes responding to the dialing pulses so that a first of said gas-filled tubes becomes conductive when the circuit of said junction line is closed and the second one of said gas-filled tubes becomes conductive when the circuit of said junction line is opened, a source of fixed potential, resistors respectively connected between said output electrodes and said source of fixed potential, a capacitor connected electrically between the output electrode of said second gas-filled tube and said counting circuit, and a source of bias voltage connected to said rectifier, said rectifier being polarized and biased to be conductive only when said second gas-filled tube is cut off due to ignition of said first gas-filled tube.

References Cited in the file of this patent

UNITED STATES PATENTS

| | | |
|---|---|---|
| 2,425,307 | Desch et al. | Aug. 12, 1947 |
| 2,470,716 | Overbeck | May 17, 1949 |
| 2,623,108 | Holden | Dec. 23, 1952 |
| 2,638,506 | Bray et al. | May 21, 1953 |
| 2,649,502 | Odell | Aug. 18, 1953 |